2,810,716

BATCHWISE COPOLYMERIZATION TECHNIQUE

Richard L. Markus, Montclair, N. J., assignor to White Laboratories, Inc., Kenilworth, N. J., a corporation of New Jersey No Drawing. Application June 28, 1954,
Serial No. 439,875

6 Claims. (Cl. 260—88.1)

This invention relates to the preparation of cross-linked copolymers and is more particularly concerned with a method for producing swellable copolymers containing only a small percentage of a cross-linking agent, the method having as advantages a reproducible uniformity of cross-linkage and polymerization with reproducible swelling characteristics, yields approaching 100 percent of theoretical and an increased rate of copolymerization.

The standard methods of polymerization have resulted in a poor control of the chain length and particularly in a poor control of the distribution of the cross-linking agent in "identical batches" of the resulting resins. An attempt has been made in the prior art to overcome this disadvantage by using suspension or emulsion methods of polymerization. However, these methods produced only moderate improvements as regards the control of chain length, distribution of cross-linking agent, et cetera. It has been necessary to employ highly efficient fractionation procedures requiring tedious operative techniques and involving substantial wastage, in order that a substantially uniform polymer may be obtained. In the preparation of copolymers, suitable for use as swellable resins and having a very low percentage of cross-linking materials, the degree of cross-linkage must necessarily be low. However, it has been difficult, if not impossible, to reproduce results batch by batch and thereby prepare a uniform resin, or a resin having substantially uniform cross-linkage and swelling characteristics. The determination of the swelling combined with the determination of the content in linear polymer is known in the art as a convenient way to characterize the extent of cross-linking in resins. With swellable resins, it is particularly important that the cross-linkage be uniform, since the reduction in the amount of cross-linking by a fraction of a percent increases substantially the linear polymer formation, which in turn are soluble, rather than swellable. A small increase in the amount of cross-linkage alternatively results in formation of a dense, three dimensional network and in serious loss of the swellability of the material, which is undesirable.

It is, therefore, a principal object of the present invention to provide a technique for the preparation of swellable resins, whereby it is possible to reproduce results accurately, in the physical characteristics of the resulting copolymers, even though a batchwise procedure is employed. Another object of the present invention is to provide a technique for increasing the rate of copolymerization as measured by the time required for full conversion of the monomeric materials to a previously determined standard copolymeric material. Still a further object of the present invention is to provide a procedure which gives a substantially uniform degree of cross-linkage in batchwise techniques. Another object of the present invention is to provide a polymerization method that gives yields approaching 100 percent of that theoretically possible. Still a further object of the present invention is to provide a procedure for the copolymerization of one or a combination of several monomeric materials with a di-unsaturated material or a polyunsaturated material in the presence of a suitable catalyst, and in the presence of a saturated aqueous solution of a salt, whereby a uniform degree of cross-linkage is obtainable in a rapid and relatively easily performed procedure. Another object of the present invention is the provision of a process allowing accurate control of the rate of copolymerization. Other objects will become apparent hereinafter.

It has now been found that, if a particular group of copolymers are prepared in the presence of an aqueous solution of an appropriate divalent ion, a uniform degree of cross-linkage and batchwise reproducibility of results may be obtained. The invention contemplates that a suitable monomeric material, capable of both homopolymerization and copolymerization, will be reacted with a di-unsaturated mateiral, said unsaturated material being present in an amount between about 0.01 and 0.2 percent, based on the amount of monomeric material employed. Additionally, a polymerization initiator and a suitable "beading" material will be employed if desired. Suitable monomeric materials include, for example, acrolein, allylidenediacetate, acrylonitrile, acrylic acid, salts and esters of acrylic acid, including methyl acrylate and ethyl acrylate, methacrylic acid, salts and esters of methacrylic acid, including methyl methacrylate and ethyl methacrylate, fumaric acid, monomethylfumarate, dimethylfumarate, monoethylfumarate, diethylfumarate, maleic anhydride, maleic acid, monomethylmaleate, dimethylmaleate, monoethylmaleate, diethylamleate, dimethylmethylenemalonate, diethylmethylenemalonate, itaconic acid, monomethylitaconate, dimethylitaconate, monoethylitaconate, diethylitaconate, atropic acid, methyl atropate, ethyl atropate, chloroacrylic acid and esters thereof, bromoacrylic acid and esters thereof, iodoacrylic acid and esters thereof, ortho-, meta-, and para-methylstyrene, ortho-, meta-, and para-fluorostyrene, ortho-, meta-, and para-chlorostyrene, alpha-sultoacrylic acid, salts and esters, alpha-amino-acrylic acid and acid salts and esters thereof, acrylamide, N-monomethyl and N,N-dimethylacrylamide, methacrylamide, acrylic anhydride, methacrylic anhydride, methylvinylketone, hydroxymethylvinylketone, ortho-, and para-methoxystyrene, ethyleneglycolmonomaleate, ethyleneglycolmonofumarate, N-vinylmethylacetamide, vinylacetate, vinylbutyrate, vinylbenzoate, vinylquinoline, vinylpyridines, for instance, 2-vinylpyridine, 2-methyl-5-vinylpyridine, 4-vinylpyridine, 2-vinyl-5-ethylpyridine, N-vinylpyroolidone, cyclopentadiene, N-vinylphthalimide, N-vinylsuccinimide, N-vinylacetamide, N-vinyl-diacetimide, that is, a double bond-containing organic compound, subject of polymerization in the presence of appropriate catalysts or initiators and conditions. Suitable poly-unsaturated materials (containing at least two double bonds), will include, for example, butadiene, N,N-diallylacrylamide, diallylamine, diallylmethacrylamide, 2,5 - dimethyl-3,4-dihydroxy - 1,5-hexadiene, 2,5-dimethyl-2,4-hexadiene, divinylbenzene, divinyl ether of diethylene glycol, isoprene, trivinyl benzene, 2,7-dimethyl-1,7-octadiene, 1,7-octadiene, p-diisopropenylbenzene, 1,3,5-triisopropenylbenzene, p,p'-diisopropenyldiphenyl, 1,1,3,5-tetrallyl-1,3-propanediol, 1,1,3,3-tetramethallyl-1,3-propanediol, 4,6 - dimethyl-4,6-dihydroxy-1,8-nonadiene, 2,4,6,8-tetramethyl-4,6-dihydroxy-1,8-nonadiene, nonadiene-1,8 and 2,8-dimethyl-nonadiene-1,8, that is, a material which contains two or more double bonds subject to cross-linkage with the monomeric materials previously defined and may be either aromatic or aliphatic. A critical element of the present invention is that the di-unsaturated material be employed in an amount such that the swellable resin which results contains between about 0.01 and 0.2 percent of the cross-linking material. When amounts less than this are employed, the resulting polymer is usually soluble while only limited swellability results when amounts in excess of this are employed. Suitable copolymerization initiators contemplated within the scope of the present invention include, for example, benzoylperoxide, 2,2'-azobisisobutyronitrile, potassium persulfate, acetylperoxide, sodium alkene derivatives, di-tertiary butylperoxide, cumene hydroperoxide, tetraphenylsuccinodinitrile, tetra-p-methoxyphenylsuccinodinitrile, et cetera, that is, an initiator (or free radical "catalyzing") material which will cause polymerization of the monomeric substances selected with concomitant copolymerization of the di-unsaturated material. The catalyst is usually employed in an amount of between 0.01 and 1.0 percent by weight of the monomeric material.

The novel concept of the present invention comprises copolymerization of the foregoing materials in the presence of an aqueous solution of a soluble non-redox divalent inorganic ion, such as, for example, barium, beryllium, cadmium, calcium, carbonate, chromium, cobalt, lead, magnesium, manganese, molybdate, nickel, selenate, strontium, sulfate, tin, tungsten, zinc, et cetera. The divalent ion is usually employed in any concentration above about one-half molar concentration. A suspension agent may be utilized to obtain an individual bead formation and avoid "clumping." This material is employed in an amount above about 0.01–0.1 percent, preferably 0.02 percent. Representative materials which are suitable as suspending agents, include, for example, casein, detergents, gelatin, gum, kaolin, methylcellulose, polyvinylalcohol, partly hydrolyzed polyvinylacetate, talc, tragacanth and protective colloids, which are well known in the art. A solvent may be employed which is chemically inert to the reactants, reaction components and reaction products. Representative solvents which are suitable include, for example, acetone, acetic acid, petroleum ether, benzene, toluene, xylene, aliphatic, aromatic and alicyclic hydrocarbons, et cetera.

The reaction is conducted by contacting the monomeric materials and the di-unsaturated or poly-unsaturated material in the presence of an aqueous solution of the non-redox di-valent inorganic ion. These materials are contacted at a temperature above about room temperature and up to the reflux temperature of the reaction mixture, at the pressure employed. Pressure may be applied by means of an inert gas such as carbon dioxide, nitrogen, or any of the rare gases, in order to control the reflux temperature (volatility) of the system. After a suitable period of time, which in general, does not exceed over about two hours, the copolymerization has been completed and beads have formed. In some specific cases (if styrene is used as a main monomer) twenty hours may be required for full conversion. Then, the materials are separated by filtration, or other conventional methods of isolation, and there is thus obtained a uniformly cross-linked material reproducible in second, third and hundredth batch by utilizing substantially the same techniques.

It is to be understood that the amount of di- or poly-unsaturated material introduced into the reaction will regulate substantially the degree of copolymerization and concomitantly, the degree of swellability, and accurate control of the amount of this cross-linking material reacted is important.

Yields are based on dry weight of the swellable resin fraction (cross-linked polymer) after complete extraction of the soluble fractions (linear polymer) in an appropriate solvent (swellant).

The following examples are given to illustrate certain procedures of the present invention, but are not to be construed as limiting.

*Example 1*

A mixture of 100 grams of acrylic acid, 1.2 grams of divinylbenzene and one gram of benzoylperoxide were added to an aqueous saturated magnesium sulfate solution and heated to 95 degrees centigrade. After sixteen minutes, there was obtained 100.5 grams of a highly swelling resin, and this same resin was easily obtainable upon repetition of the procedure.

*Example 2*

A mixture of 100 grams of acrylic acid, 0.92 gram of divinylbenzene and 0.4 gram of azobisisobutyronitrile was added to an aqueous saturated beryllium chloride solution and the mixture heated to 95 degrees centigrade. After heating thirteen minutes, there was obtained 78.2 grams of a highly swelling resin. These results are easily reproducible upon a repetition of the procedure.

*Example 3*

A mixture of 100 grams of methacrylic acid and 0.92 gram of divinylbenzene was mixed with 1.0 gram benzoylperoxide and the mixture was added to a saturated magnesium sulfate solution in water. After heating for thirty minutes, there was obtained 64.5 grams of a highly swelling resin. This procedure was repeated, and a substantially uniform bead size, as well as the same degree of swelling of the product was obtained.

*Example 4*

A mixture of 100 grams of acrylic acid, 0.59 gram of 3,4-dihydroxy-2,5-dimethyl-1,5-hexadiene and 0.030 gram of azobisisobutyronitrile was added to an aqueous saturated magnesium sulfate solution and heated for twenty minutes at 95 degrees centigrade. There was thus obtained 134 grams of resin, after conversion into the sodium cycle, reproducible upon repetition of the procedure.

*Example 5*

A mixture of 100 grams of acrylic acid with 2.2 grams of divinylbenzene and ten grams of potassium sulfate was added to an aqueous magnesium sulfate solution. After heating for one hour at sixty degrees centigrade, there was obtained 114.5 grams of hydrophilic resin, reproducible upon repeating the procedure.

*Example 6*

A mixture of 277 grams of ethyl acrylate, 1.84 grams of divinylbenzene and 0.6 gram of azobisisobutyronitrile was added to an aqueous saturated magnesium sulfate solution and heated for forty minuates at 95 degrees centigrade. This procedure resulted in a yield of 169 grams of loosely cross-linked resin, easily duplicated upon repeating the procedure.

*Example 7*

A mixture of 100 grams of acrylamide and 0.92 gram of divinylbenzene with 0.3 gram of azobisisobutyronitrile as catalyst, was added to an aqueous saturated magnesium sulfate solution and heated at 95 degrees centigrade. The yield was 103 grams of highly swellable resin, reproducible upon duplicating the materials and steps.

*Example 8*

Fifty grams of monoethylfumarate, fifty grams of styrene and 0.92 gram of divinylbenzene with 0.30 gram of azobisisobutyronitrile as catalyst was added to an aqueous saturated magnesium sulfate solution. Upon heating the mixture at 95 degrees centigrade there was obtained 83 grams of loosely cross-linked resin, which was again obtained by repeating this procedure.

*Example 9*

Fifty grams of diethylfumarate, fifty grams of styrene, 0.92 gram of divinylbenzene and 0.30 gram of azobisisobutyronitrile was added to an aqueous saturated magnesium sulfate solution and heated at 95 degrees centigrade. 48.5 grams of loosely cross-linked resin was obtained, this resin being swellable to about 100 times its

Example 10

A mixture of 200 grams of methylenediethylmalonate, 1.84 gram of divinylbenzene and 0.6 gram of azobisisobutyronitrile was added to an aqueous magnesium sulfate solution and heated at 95 degrees centigrade. Upon filtering, washing and drying, 124 grams of a soft, rubbery resin was obtained, swellable in tetrahydrofuran.

Example 11

100 grams of styrene, 0.092 gram of divinylbenzene and 0.250 gram of benzoylperoxide was added to a magnesium sulfate solution and heated for sixteen hours. Upon filtering, washing and drying, there was obtained 97.5 grams of benzene swellable resin, reproducible upon repeating the procedure. Sulfonation of the copolymer in known manner will result in a water-swellable material.

Example 12

A mixture of 165 grams of 2-methyl-5-vinylpyridine, 0.46 gram of divinylbenzene and 0.3 gram of azobisisobutyronitrile was added to an aqueous saturated magnesium sulfate solution to yield 155 grams of a loosely cross-linked resin, having a high degree of swellability in dilute aqueous hydrochloric acid. The resin is readily duplicated upon repeating the above procedure.

Example 13

A mixture of 100 grams of N-vinylpyrrolidone, 1.0 gram of divinylbenzene and 0.3 gram of azobisisobutyronitrile was added to an aqueous magnesium sulfate solution and heated to yield 81 grams of loosely cross-linked water-swellable resin, which may be readily duplicated upon repeating of the above procedure.

Example 14

A mixture of 30.0 grams of N-vinylphthalimide, 0.270 gram of divinylbenzene and 0.3 gram of benzoylperoxide as a catalyst in an aqueous saturated magnesium sulfate solution was heated for 38 minutes at 92 degrees centigrade. There was obtained 29.5 grams of resin, swellable in a mixture of phenol and N,N-dimethyl formamide (4:1) to the extent of eight milliliters per gram.

Example 15

A mixture of 100 grams of N,N-dimethylacrylamide with 0.92 gram of divinylbenzene and 1.0 gram of benzoylperoxide as catalyst in an aqueous saturated magnesium sulfate solution was heated for 28 minutes at ninety degrees centigrade. There was thus obtained 96.6 grams of resin, swellable in distilled water to the extent of 32 milliliters per gram.

Example 16

A mixture of twenty grams of acrylamide with five grams of acrylic acid and 0.170 gram of divinylbenzene and 0.250 gram of benzoylperoxide as a catalyst in an aqueous saturated magnesium sulfate solution was heated for six minutes at 93 degrees centigrade. There was thus obtained 17.85 grams of loosely cross-linked resin, swellable in distilled water to the extent of 310 milliliters per gram.

Example 17

A mixture of 100 grams of methacrylic acid, 9.0 grams of styrene and 0.92 gram of divinylbenzene and 0.3 gram of azobisisobutyronitrile as a catalyst in an aqueous saturated magnesium sulfate solution was heated for sixteen minutes at 93.5 degrees centigrade. There was thus obtained 90.0 grams of a loosely cross-linked resin swellable in distilled water to the extent of 44.0 milliliters per gram.

Example 18

A mixture of fifty grams of acrylic acid with fifty grams of styrene, 0.92 gram of divinylbenzene and 0.3 gram of azobisisobutyronitrile as a catalyst in an aqueous magnesium sulfate solution, was heated for forty minutes at 94 degrees centigrade. There was obtained 89 grams of a loosely cross-linked resin showing a swelling volume in distilled water of sixty milliliters per gram.

Example 19

A mixture of forty grams of methylenediethylmalonate, forty grams of diethylfumarate, and 1.84 grams of divinylbenzene using 0.6 gram of azobisisobutyronitrile as a catalyst in a saturated magnesium sulfate solution was heated for eight minutes at 93 degrees centigrade. There was obtained 23.5 grams of a loosely cross-linked resin showing a swelling of eleven milliliters per gram in tetrahydrofuran.

Example 20

A mixture of forty grams of methylenediethylmalonate, sixty grams of ethylacrylate and 1.84 grams of divinylbenzene, using 0.3 gram of azobisisobutyronitrile as a catalyst in an aqueous saturated magnesium sulfate solution was heated for thirteen minutes at 93 degrees centigrade. There was thus obtained 77.0 grams of a loosely cross-linked resin swellable to the extent of fifteen milliliters per gram in tetrahydrofuran. This resin is easily reproducible by a repetition of the procedure above-recited.

Example 21

A mixture of 31.5 grams of 2-vinylpyridine and 0.200 gram of divinylbenzene, using 0.060 gram of azobisisobutyronitrile as an initiator in an aqueous saturated magnesium sulfate solution was heated for forty minutes at 92 degrees centigrade. Twenty-eight (28) grams of resin were obtained, swellable in aqueous acids.

Example 22

A mixture of 150 grams of styrene and 0.200 gram of divinylbenzene, using 0.030 gram of benzoylperoxide as a catalyst in an aqueous saturated calcium chloride solution was heated for twenty hours at 110 degrees centigrade. One hundred forty-nine (149) grams of loosely cross-linked resin swellable in benzene was obtained of which 83 percent was linear-free.

Example 23

A mixture of 150 grams of styrene and 0.200 gram of divinylbenzene, using 0.130 gram of tetraphenylsuccinodinitrile as a catalyst in an aqueous saturated calcium chloride solution was heated for nineteen hours at 115 degrees centigrade. One hundred fifty (150) grams of resin, swellable to the extent of fifty milliliters per gram in benzene, was obtained, of which 74 percent was linear free.

Example 24

A mixture of 150 grams of styrene and 0.300 gram of triisopropenylbenzene, using 0.040 gram of benzoylperoxide as a catalyst in an aqueous saturated calcium chloride solution was heated for twenty hours at 113 degrees centigrade. One hundred fifty (150) grams of resin was obtained, swellable in benzene to the extent of forty milliliters per gram.

Example 25

A mixture of one hundred grams of acrylic acid and 1.0 gram of 4,6-dihydroxy-4,6-dimethyl-1,8-nonadiene, using 0.300 gram of azobisisobutyronitrile as a catalyst in an aqueous saturated magnesium sulfate solution, was heated for fifteen minutes at 84 degrees centigrade. Eighty-eight (88) grams of linear-free resin were obtained in the hydrogen cycle. A sample, converted into the sodium cycle showed a swelling of 115 milliliters per gram in pure water.

Example 26

A mixture of 100 grams of acrylic acid and 1.15 grams of 2,4,6,8-tetramethyl-4,6-dihydroxy-1,8-nonadiene using 0.300 gram of azobisisobutyronitrile as a catalyst in an aqueous saturated magnesium sulfate solution, was heated for five minutes at 92 degrees centigrade. Seventy-five (75) grams of resin were obtained in the hydrogen cycle. A sample converted into the sodium cycle was swellable to the extent of 650 milliliters per gram in pure water.

Example 27

A mixture of 100 grams of acrylic acid and 0.60 gram of 1,1,3,3,-tetraallyl-1,3-dihydroxypropane, using 0.300 gram azobisisobutyronitrile as a catalyst in an aqueous saturated magnesium sulfate solution was heated for five minutes at 87 degrees centigrade. Eighty-two and one-half (82.5) grams of the linear-free resin in the hydrogen cycle were obtained. One gram of the sodium cycle of the same resin was found to be swellable to the extent of 102 milliliters in pure water.

Example 28

A mixture of 845 grams of styrene and 1.25 grams of divinylbenzene, using 0.76 gram of tetraphenylsuccinodinitrile as a catalyst was heated in an aqueous calcium chloride solution under fourteen pounds per square inch pressure of nitrogen gas at 130 degrees centigrade for twenty hours. Eight hundred forty-two (842) grams of loosely cross-linked resin were obtained, swellable in benzene to the extent of 45 milliliters per gram. The linear content of the resin was 26 percent.

Example 29

A mixture of 150 grams of styrene and 0.300 gram of paradiidopropenylbenzene, using 0.030 gram of benzoylperoxide as a catalyst was heated in an aqueous saturated calcium chloride solution for 22 hours at 117 degrees centigrade. One hundred fifty (150) grams of resin were obtained, swellable to the extent of 26 milliliters per gram, containing three percent of linear polymer.

Example 30

A mixture of 150 grams of styrene and 0.150 gram of paradiidopropenylbenzene, using 0.030 gram of benzoylperoxide as a catalyst was heated in an aqueous saturated calcium chloride solution for 23 hours at 119 degrees centigrade. One hundred fifty (150) grams of resin were obtained, swellable in benzene to the extent of 47 milliliters per gram. This resin contained 11.8 percent of linear polymer.

Example 31

A mixture of 150 grams of styrene and 0.150 gram of paradiisopropenylbenzene, using 0.135 gram of tetraphenylsuccinodinitrile as a catalyst was heated in an aqueous calcium chloride solution for twenty hours at 117 degrees centigrade. One hundred fifty (150) grams of resin were obtained, swellable in benzene to the extent of 26 milliliters per gram. The linear content of this resin was 9.5 percent.

Example 32

A mixture of 150 grams of styrene and 0.150 gram of p,p'-diisopropenyldiphenyl, using 0.135 gram of tetraphenylsuccinodinitrile as a catalyst was heated in an aqueous calcium chloride solution containing 0.220 gram of partly hydrolyzed polyvinylacetate as a suspending agent for 21 hours at 117 degrees centigrade. One hundred forty-two (142) grams of resin were obtained, swellable in benzene to the extent of 59 milliliters per gram. The linear content of this resin batch was 36.3 percent.

Example 33

A mixture of 150 grams of styrene and 0.250 gram of p,p'-diisopropenyldiphenyl, using 0.135 gram of tetraphenylsuccinodinitrile as a catalyst was heated in an aqueous, saturated solution of calcium chloride, containing 0.220 gram of partly hydrolyzed polyvinylacetate as a suspending agent, at 112 degrees centigrade for eighteen hours. One hundred fifty (150) grams of resin were obtained, swellable to the extent of 45 milliliters per gram. This resin batch contained 20.5 percent of linear polymer.

Example 34

A mixture of 100 grams of acrylic acid and 0.50 gram of para-diisopropenylbenzene and 0.30 gram of azobisisobutyronitrile was heated in an aqueous saturated solution of magnesium sulfate at 92 degrees centigrade for five minutes. Seventy-two (72) grams of linear-free resin was obtained. This resin showed, after conversion into the sodium cycle, a swelling in pure water to the extent of 340 milliliters per gram.

Example 35

A mixture of 150 grams of styrene and 0.300 gram of p,p'-diisopropenyldiphenyl, using 0.135 gram of tetraphenylsuccinodinitrile as an initiator was heated in an aqueous calcium chloride solution containing 0.220 gram of partly hydrolyzed polyvinylacetate as a suspending agent for 24 hours at 115 degrees centigrade. One hundred forty-nine (149) grams of resin were obtained, swellable in benzene to the extent of 21 milliliters per gram. The linear content of this batch was 4.3 percent. Bromine titration has revealed a residual unsaturation of 2.08 percent (unsaturation of monomer: 100 percent).

Example 36

A mixture of 100 grams of acrylamide and 1.00 gram of p-diisopropenylbenzene using 0.300 gram azobisisobutyronitrile as an initiator was heated in an aqueous solution of secondary sodium phosphate for five (5) minutes at 91 degrees centigrade. Sixty-five grams of resin were obtained, swellable in water to the extent of 130 milliliters per gram.

Example 37

A mixture of 200 grams of 2-vinylpyridine and 2.0 gram of p-diisopropenylbenzene using 0.60 gram of azobisisobutyronitrile as an initiator was heated in an aqueous solution of secondary sodium phosphate for thirty minutes at 91 degrees centigrade. One hundred seventy (170) grams of resin were obtained, swellable in 0.1 N hydrochloric acid to the extent of 46 milliliters per gram.

Example 38

A mixture of 200 grams of 2-vinylpyridine and 3.0 gram of p,p'-diisopropenyldiphenyl using 0.60 gram of azobisisobutyronitrile as an initiator was heated in an aqueous solution of secondary sodium phosphate for fifteen minutes at 92 degrees centigrade. One hundred seventy-one (171) grams of resin were obtained, swellable in 0.1 N hydrochloric acid to the extent of 48 milliliters per gram.

Example 39

A mixture of 100 grams of N-vinylphthalimide and 2.0 grams of p,p'-diisopropenyldiphenyl, using 1.0 gram of benzoylperoxide as an initiator was heated in an aqueous solution of magnesium sulfate for 65 minutes at 92 degrees centigrade. Seventy-five (75) grams of resin were obtained, swellable to the extent of eight milliliters per gram in a mixture of phenol and dimethylformamide (80:20).

In each of the above examples, the resin was separated by filtration and thereafter dried to prepare a substantially uniformly sized and uniformly-swelling resin. Upon a repetition of the procedure recited in each of the examples, it will be found that resin having substantially the same swelling characteristics and the same degree of linear polymer is prepared. Additionally, the process of the present invention allows a definite control of the rate of polymerization, as well as the degree of copolymerization.

The listed swellable resins serve as pharmaceuticals, or as intermediates in the preparation of more complex molecules.

Various modifications may be made in the method and compounds of the present invention without departing from the spirit or scope thereof, and it is to be understood that I limit myself only as defined in the appended claims.

I claim:

1. A process for producing swellable resins which comprises: contacting, in the presence of a polymerization and copolymerization initiator, a monomeric material subject to both homo- and co-polymerization with between about 0.01 and 0.2 percent of a polyunsaturated copolymerizable cross-linking agent, said contacting being carried out in the presence of a reaction medium comprising an aqueous solution at least one half molar in a soluble non-redox divalent-ion containing salt.

2. In a process for preparing a swellable resin including the copolymerization of a monomeric material subject to both homo- and co-polymerization with between about 0.01 and 0.2 percent of a polyunsaturated cross-linking comonomer, in the presence of a polymerization initiator, the improvement which comprises: conducting the reaction in the presence of an aqueous reaction medium at least one half molar in a soluble non-redox divalent-ion containing salt.

3. A process for producing a swellable resin which comprises: contacting, in the presence of a polymerization and copolymerization initiator, a monomeric material subject to both homo- and co-polymerization with between about 0.01 and 0.2 percent of a polyunsaturated copolymerizable cross-linking agent, said contacting being carried out in the presence of a reaction medium comprising an aqueous solution at least one half molar in an alkaline earth metal ion.

4. A process for producing a swellable resin which comprises: contacting, in the presence of a polymerization and copolymerization initiator, a monomeric material subject to both homo- and co-polymerization with between about 0.01 and 0.2 percent of a polyunsaturated copolymerizable cross-linking agent, said contacting being carried out in the presence of a reaction medium comprising an aqueous solution at least one half molar in magnesium ion.

5. A process for preparing a swellable resin which comprises: contacting, in the presence of a polymerization and copolymerization initiator, acrylic acid with divinylbenzene, said contacting being carried out in the presence of a reaction medium comprising a saturated magnesium sulfate solution.

6. A process for the preparation of a swellable resin which comprises: contacting, in the presence of benzoylperoxide, 100 parts of acrylic acid with 1.2 parts of divinylbenzene, said contacting being carried out in the presence of a saturated magnesium sulfate solution.

References Cited in the file of this patent

UNITED STATES PATENTS

| | | |
|---|---|---|
| 2,665,270 | Haward | Jan. 5, 1954 |
| 2,668,806 | Haward | Feb. 9, 1954 |
| 2,687,408 | Grim | Aug. 24, 1954 |